R. E. DEWEY.
THERMOSTAT DAMPER REGULATOR.
APPLICATION FILED NOV. 27, 1909.
1,011,328.
Patented Dec. 12, 1911.
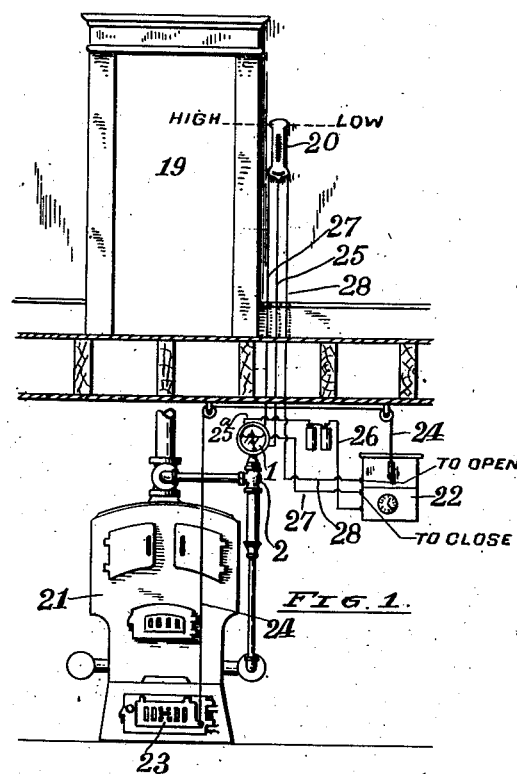
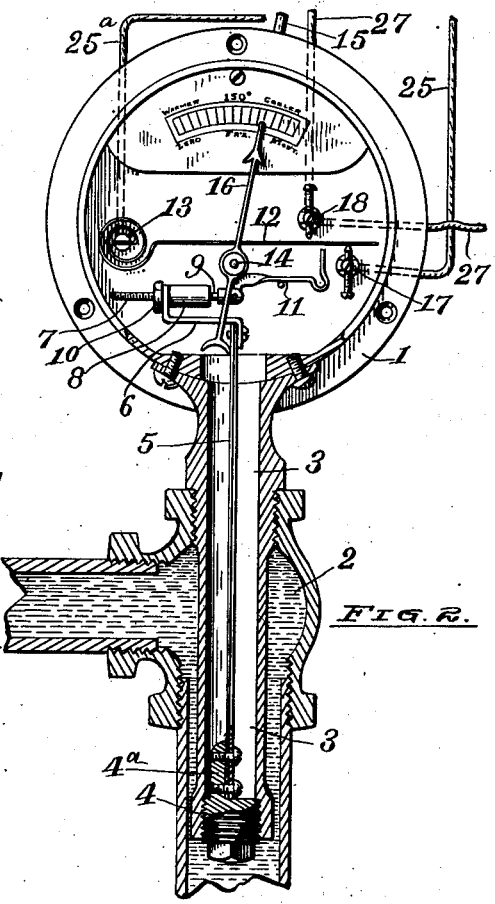
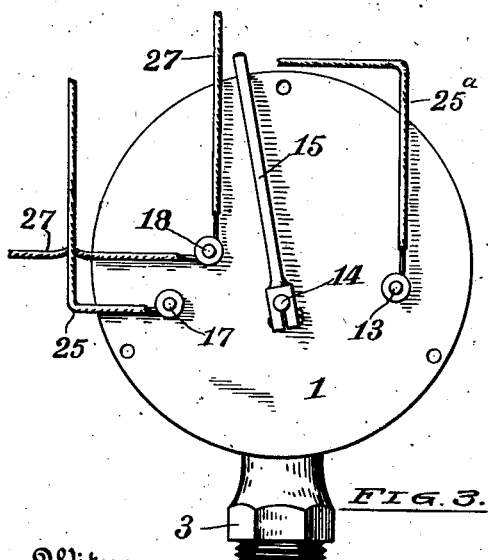
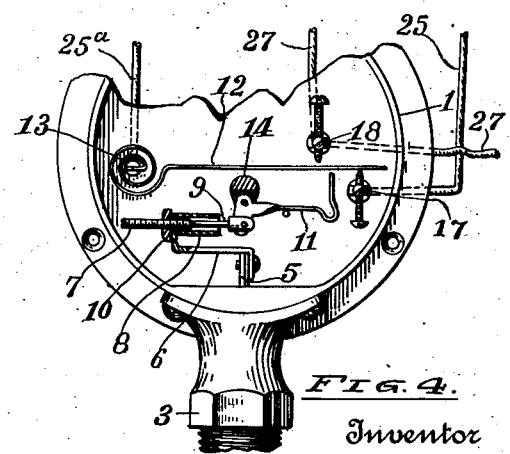
Witnesses
W. C. Van Antwerp.
Georgiana Chace
Inventor
RUEL E. DEWEY
By Luther V. Moulton
Attorney

UNITED STATES PATENT OFFICE.

RUEL E. DEWEY, OF GRAND RAPIDS, MICHIGAN.

THERMOSTAT DAMPER-REGULATOR.

1,011,328.     Specification of Letters Patent.     Patented Dec. 12, 1911.

Application filed November 27, 1909. Serial No. 530,132.

*To all whom it may concern:*

Be it known that I, RUEL E. DEWEY, a citizen of the United States of America, residing at Grand Rapids, in the county of Kent and State of Michigan, have invented certain new and useful Improvements in Thermostat Damper-Regulators; and I do hereby declare the following to be a full, clear, and exact description of the invention, such as will enable others skilled in the art to which it appertains to make and use the same.

My invention relates to improvements in thermostat damper regulators, and more particularly to improvements in the device shown in my Patent No. 926,391, dated June 29, 1909, on thermostat damper regulator, and its object is to simplify the construction and improve the operation of the device.

In the patent referred to, I show all of the conductors of the room thermostat, connected through the auxiliary thermostat, and the latter operating a switch in each opening and closing circuit of the room thermostat. When the auxiliary thermostat operates to both open and close the damper it requires two switch members in the auxiliary thermostat; I find however that this is unnecessary and complicated, and that by arranging the conductors and switches as herein described, but one switch member in the auxiliary thermostat is sufficient, much simpler and better, thus limiting the auxiliary thermostat to closing the damper only, it being preferable to keep the damper closed as long as the room is warm enough. In my present device I connect the single switch member of each thermostat in series and directly with the battery, connecting the room thermostat at one side directly to the motor to open the damper at the other side through the auxiliary thermostat to operate the motor to close the damper, both thermostats are thus adapted to close the damper and one only adapted to open the same; the auxiliary thermostat thus cuts out the room thermostat and short circuits the closing circuit to close the damper whenever the temperature of the heating medium rises and restores the circuit of the room thermostat when said temperature falls but does not open the damper.

Referring to the accompanying drawings, Figure 1 is a diagrammatic representation of a portion of a building showing the application of my device to a heating system; Fig. 2 an elevation partly in vertical section of a device embodying my invention; Fig. 3 a rear elevation of the upper part of the same; and, Fig. 4 a front elevation of the device shown in Fig. 2 with portions broken away.

Like numbers refer to like parts in all of the figures.

19 represents a room to be heated; 20 a thermostat in the said room; 21 a boiler having a damper 23 opened and closed by a chain 24 operated by an electric motor 22. The thermostat 20 is of any of the usual forms, adapted to close one electric circuit when the temperature in the room is high and to close another electric circuit when said temperature is low. The electric motor 22 is also of any usual construction and adapted to close the damper when operated by the first named circuit and adapted to open the damper when operated by the other circuit. The "high" side of the thermostat 20 is connected to the closing side of the motor by a conductor 27; the low side of the same connected to the "opening" means of the motor by a conductor 28; the switch member of the thermostat 20 is connected to the battery by a conductor 25, and the motor connected to the battery by a conductor 26.

So far the described device is an ordinary electric thermostatic damper controller. My improvement is in the construction and arrangement therewith of an auxiliary thermostat, exposed to the temperature of the heating medium, an embodiment of which is herein shown in which:—

1 represents a case of any desired form, preferably circular as shown.

2 represents any convenient chamber communicating with the boiler containing the heating fluid to operate the heating system. This chamber may be either a portion of the boiler itself, or closely connected therewith in such manner that the fluid contained therein will be substantially of the same temperature as the fluid in the boiler.

3 is a tube inserted in this chamber and externally exposed to the fluid therein and heated thereby, being closed at its lower end by a plug 4 having a lug 4ª on its inner end to which latter is attached a shifting thermostat member 5, which extends upward through the tube 3 and into the case 1, and is laterally movable therein in the usual way by virtue of the unequal expansion of the two strips of metal of which it is composed, moving to the right as the temperature increases, and to the left as the temperature decreases. An arm 6 having an upturned end to support the adjusting screw 7 and tubular guide 8, is attached to the movable end of the member 5.

9 is a push rod, one end of which is slidable within the tubular guide 8 and engages the end of an adjusting screw 7, this screw being provided with a lock nut 10 to hold it in any adjusted position. The screw can thus move away from the push rod when the device cools down. The opposite end of the push rod 9 is pivoted to the short arm of a bell crank 11, the other arm of which is upturned to engage a movable electrode or switch member 12 fixed at one end in a binding post 13 and movable at its other end to alternately engage contact screws in the posts 17 and 18. The bell crank 11 is eccentrically pivoted to a rotative support 14, which extends through the back of the case and is provided with a lever 15 by which it is manually adjusted about its axis. Said support 14 is also provided with an index 16 which traverses a scale conveniently located to indicate the desired temperature to which the heating fluid in the boiler is to be regulated. By turning the support 14 about its axis, the bell crank lever is adjusted toward or away from the screw 7, thus changing the temperature at which the electrode 12 will be lifted by the bell crank lever and the electric circuits shifted, as hereafter described. The electrode 12 normally engages an adjustable screw contact in the binding post 17, and when raised by the bell crank 11, engages a similar adjustable screw contact in the binding post 18. The binding posts 13, 17 and 18 extend through the back of the case 1 and are insulated therefrom, the post 18 being joined to the conductor 27 and the posts 13 and 17 forming terminals at each side of a gap in the conductor 25 said gap being normally closed by the movable electrode or switch member 12. The posts 13 and 17 and the electrode 12 thus are normally in circuit with the conductor 25 and close the connection of the switch member of the thermostat 20 with the battery.

In operation, when the heating fluid is at or below the required temperature, the electrode 12 will normally engage the screw in the binding post 17 and the thermostat 20 will operate to open and close the damper in the usual way. Should the temperature of the heating fluid rise above the maximum temperature for which the device is adjusted as indicated by the index 16, the thermostat member 5 will move to the right and moving the bell crank 11, will thus raise the end of the electrode 12 away from the contact in the binding post 17 and in engagement with the contact in the post 18 thus breaking the circuit of the thermostat 20, closing the closing circuit of the motor, and operating the motor to close the damper, which will remain closed until the temperature of the heating fluid falls enough to allow the thermostat member 5 to move to the left and lower the electrode 12 into engagement with the contact in the post 17, whereupon the room thermostat will resume operation as before. I find that this fall of temperature in the heating fluid and restoration of the room thermostat to operation will occur before it becomes necessary to open the damper again; I am thus able to dispense with any damper opening function of the auxiliary thermostat and materially simplify its construction.

What I claim is:—

1. In combination with a heat generator having a damper, a motor for controlling said damper and a thermostat having electrical connections for controlling said motor; a device comprising a conductor joined to a motor connection of said thermostat, a switch adapted to contact with said conductor inserted in the battery connection of said thermostat and a thermal element directly subject to the heat of said generator adapted to control said switch.

2. In combination with a heat generator having a damper, an electric motor for opening and closing said damper, a thermostat connected to a battery and having two electrical connections to the motor to respectively control the motor to open and close the damper, a lateral conductor in the closing connection, a switch in the battery connection of the thermostat and a thermal element adapted to shift said switch subjected directly to the heat of said generator.

3. In combination with a heat generator having a damper, an electric motor to open and close the damper, a thermostat having its thermal element connected to a battery and its terminals respectively connected to the opening and closing mechanism of the motor, and an auxiliary thermostat having its thermal element subjected directly to the heat of said generator, a switch in the circuit of the battery connection shifted by movement of said element to shift the battery connection from the first named thermostat to the closing connection of the same.

4. In combination with a heat generator having a damper, means for opening and closing the said damper, a thermostat connected to a battery and having one electric connection to the closing means and another connection to the opening means to respectively control the same, a switch in the battery connection of the thermostat adapted to shift the battery connection from the thermostat to the closing means, and a thermal element adapted to operate the switch subjected directly to the heat of said generator.

5. In combination with a heat generator having a damper, means for opening said damper, means for closing said damper, a thermostat having its movable terminal connected to a battery, conductors from said thermostat to respectively control the opening and closing means, a switch in the battery connection normally closing the same and adapted to shift the same to the connection for controlling the closing means, a thermal element moved by change of temperature and directly subjected to the heat of said generator, a tube carried by said element, a pin slidable in the tube, an adjustable screw in the tube engaging the pin and a lever operated by the pin to shift the switch.

6. In combination with a heat generator having a damper, means for closing the damper, means for opening the damper, a thermostat, a connection from the thermostat to control the closing means, a second connection from the thermostat to control the opening means, a switch in the battery connection and normally closing the same, a thermal element subjected directly to the heat of said generator and adapted to move the switch and shift the battery circuit from the thermostat to the closing means when the temperature rises and to restore the battery connection to the thermostat when the said temperature falls.

In testimony whereof I affix my signature in presence of two witnesses.

RUEL E. DEWEY.

Witnesses:
GEORGIANA CHACE,
LUTHER V. MOULTON.